(12) United States Patent
Mumtaz et al.

(10) Patent No.: US 8,856,608 B2
(45) Date of Patent: Oct. 7, 2014

(54) MODULATION METHOD AND DEVICE IMPLEMENTING A DIFFERENTIAL MODULATION, CORRESPONDING DEMODULATION METHOD AND DEVICE, SIGNAL AND COMPUTER SOFTWARE PRODUCTS

(75) Inventors: Sami Mumtaz, Bois d'Arcy (FR); Ghaya Rekaya-Ben Othman, Antony (FR); Yves Jaouen, Paris (FR)

(73) Assignee: Institut Telecom/Telecom Paristech, Paris (FR)

( * ) Notice: Subject to any disclaimer, the term of this patent is extended or adjusted under 35 U.S.C. 154(b) by 342 days.

(21) Appl. No.: 13/262,751

(22) PCT Filed: Apr. 2, 2010

(86) PCT No.: PCT/EP2010/054467
§ 371 (c)(1),
(2), (4) Date: Feb. 6, 2012

(87) PCT Pub. No.: WO2010/112606
PCT Pub. Date: Oct. 7, 2010

(65) Prior Publication Data
US 2012/0131411 A1    May 24, 2012

(30) Foreign Application Priority Data
Apr. 3, 2009  (FR) .................................... 09 52207

(51) Int. Cl.
*H03M 13/00* (2006.01)
*H04L 1/00* (2006.01)

(52) U.S. Cl.
CPC ............ *H04L 1/0071* (2013.01); *H04L 1/0047* (2013.01); *H04L 1/0057* (2013.01); *H04L 1/0042* (2013.01); *H04L 1/0054* (2013.01)
USPC ......................................... 714/755; 714/752

(58) Field of Classification Search
CPC . H03M 13/2957; H03M 13/29; H03M 13/27; H03M 13/2906; G11B 20/1833
USPC .......................................... 714/755, 758, 752
See application file for complete search history.

(56) References Cited

U.S. PATENT DOCUMENTS 3,891,959 A * 6/1975 Tsuji et al. ..................... 714/786
4,092,491 A * 5/1978 Frazer ............................ 375/283

(Continued)

FOREIGN PATENT DOCUMENTS

EP  0777354 A2  6/1997
EP  1501198 A1  1/2005

(Continued)

OTHER PUBLICATIONS

International Search Report and Written Opinion dated Nov. 2, 2010 for corresponding International Application No. PCT/EP2010/054467, filed Apr. 2, 2010.

(Continued)

*Primary Examiner* — Albert Decady
*Assistant Examiner* — Osman Alshack
(74) *Attorney, Agent, or Firm* — David D. Brush; Westman, Champlin & Koehler, P.A.

(57) ABSTRACT

A method and apparatus are provided for modulating a binary source sequence including of a plurality of source words to generate modulated symbols. The method implements error-correction encoding of the plurality of source words, implementing one or more encoding modules, each implementing a separate error-correction code to generate a plurality of code words, the source words being encoded in series. The code words are interlaced to generate an interlaced sequence. The interlaced sequence is differentially modulated to generate modulated symbols. Each code word is broken down into at least one group with a number of bits equal to the base-2 logarithm of a number of states of a modulation implemented by the step of differentially modulating. The interlacing step distributes the groups such that two adjacent groups in the interlaced sequence belong to separate code words.

14 Claims, 5 Drawing Sheets

(56) References Cited

U.S. PATENT DOCUMENTS

| | | | |
|---|---|---|---|
| 4,270,025 A * | 5/1981 | Alsup et al. | 704/217 |
| 4,882,733 A * | 11/1989 | Tanner | 714/752 |
| 6,754,262 B1 * | 6/2004 | Citta et al. | 375/232 |
| 7,583,584 B2 * | 9/2009 | Wang et al. | 370/206 |
| 8,549,377 B1 * | 10/2013 | Kons et al. | 714/755 |
| 2002/0138793 A1 * | 9/2002 | Wilhelmsson | 714/701 |
| 2004/0097215 A1 * | 5/2004 | Abe et al. | 455/403 |
| 2006/0153181 A1 * | 7/2006 | Wu | 370/389 |
| 2006/0209813 A1 * | 9/2006 | Higuchi et al. | 370/366 |
| 2007/0082696 A1 * | 4/2007 | Wang | 455/550.1 |
| 2008/0034197 A1 * | 2/2008 | Engel et al. | 713/150 |
| 2012/0026021 A1 * | 2/2012 | Eiselt | 341/67 |

FOREIGN PATENT DOCUMENTS

| | | | |
|---|---|---|---|
| EP | 1523099 | * | 4/2005 |
| WO | 2008009627 A1 | | 1/2008 |

OTHER PUBLICATIONS

English Translation of the International Preliminary Report on Patentability and Written Opinion dated Nov. 2, 2010 for corresponding International Application No. PCT/EP2010/054467, filed Apr. 2, 2010.

* cited by examiner

MODULATION METHOD AND DEVICE IMPLEMENTING A DIFFERENTIAL MODULATION, CORRESPONDING DEMODULATION METHOD AND DEVICE, SIGNAL AND COMPUTER SOFTWARE PRODUCTS

CROSS-REFERENCE TO RELATED APPLICATIONS

This Application is a Section 371 National Stage Application of International Application No. PCT/EP2010/054467, filed Apr. 2, 2010 and published as WO 2010/112606 on Oct. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications.

More specifically, the disclosure pertains to the transmission of data implementing a differential modulation type of modulation format. Such a differential modulation transforms a binary sequence into a modulated signal. The binary sequence at input of the modulation step corresponds to the transitions between the states of the constellation of the modulation used to generate the modulated symbols. A differential modulation can be seen as a differential encoding of a binary sequence, delivering another binary sequence, followed by a classic modulation.

The disclosure finds application in any system of transmission using a differential modulation. In particular, the invention can be applied in the field of optical communications:
  with direct detection according to the DBPSK (Differential Binary Phase Shift Keying) type of modulation or DQPSK (Differential Quadrature Phase Shift Keying) type of modulation at 10 Gb/s and 40 Gb/s, or
  with coherent detection according to the QPSK (Quadrature Phase Keying) type modulation or PDM-QPSK (Polarization Division Multiplexing-QPSK) type modulation at 40 Gb/s and 100 Gb/s.

BACKGROUND OF THE DISCLOSURE

In the field of optical communications, especially at high bit rates, phase modulation has many advantages, both from the viewpoint of spectral efficiency and that of transmission quality (because of the reduction of non-linear effects related to the modulation of intensity in particular).

For example, the DBPSK modulation format is particularly advantageous for non-coherent transmission. In direct detection, the phase of the transmitted signal is lost at reception but can be retrieved through measurement of the difference in phase between two successive symbols, through an optical demodulation performed by an MZDI (a Mach-Zender delay interferometer) type interferometer for example. The differential encoding of the data to be transmitted proves to be necessary in order to enable the use of a phase modulation in direct detection.

The QPSK and PDM-QPSK modulation formats for their part are particularly worthwhile for coherent transmissions having a bit rate greater than or equal to 40 Gb/s. The use of a coherent receiver makes the phase of the transmitted signal directly accessible. It is therefore possible to use modulation formats with high spectral efficiency. However, the phase noise remains a major problem which the phase retrieval algorithms (of the Viterbi type) are unable to process totally. Here too, the differential encoding of the data to be transmitted proves to be necessary.

It is thus seen that differential encoding combined with phase modulation improves the performance of the transmission system.

Unfortunately, the implementing of differential encoding leads to a higher error rates than a classic encoding because a transmission error produces two errors on the data transmitted in the form of information symbols. More generally, k successive transmission errors produce k+1 errors on the information symbols.

Figure 1A:
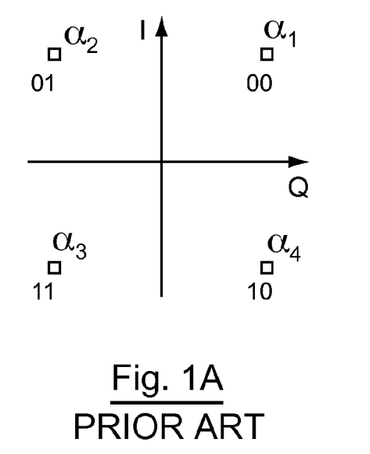
FIGS. 1A and 1B are a reminder of the working of a classic modulation and a differential modulation.

More specifically, in the case of a QPSK type modulation for example, the classic encoding as illustrated in FIG. 1A enables the association of an information symbol comprising two bits with a modulated symbol corresponding to a state $\alpha_i$ of the constellation. For a QPSK modulation, the states of the constellation associated with the modulated symbols are: $\alpha_1 = e^{j\pi/4}$, $\alpha_2 = e^{3j\pi/4}$, etc.

Figure 1B:
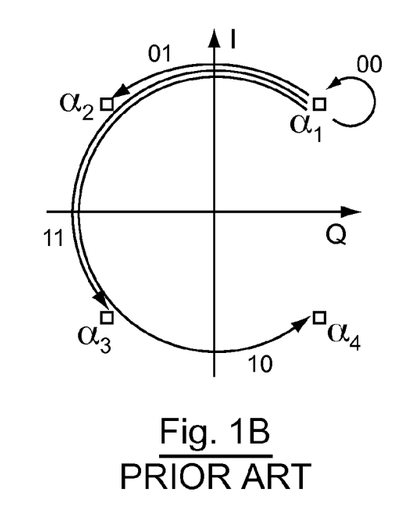

Differential encoding as illustrated in FIG. 1B makes it possible, for its part, to encode the data to be transmitted by the transition between the states of the constellation used. In other words, an information symbol corresponds to two bits which encode the change in phase between two states $\alpha_i$ of the constellation, i.e. between two modulated symbols. For example, the sequence of information symbols '10' '11' '00' is converted into modulated symbols corresponding to the states $\alpha_1, \alpha_4, \alpha_2, \alpha_2$. If, after passing through the transmission channel, the modulated symbols received correspond to the states $\alpha_1, \alpha_4, \underline{\alpha_1}, \alpha_2$, which corresponds to one transmission error, then the reconstructed information symbols will be '10' '$\underline{01}$' '$\underline{01}$', corresponding to two errors on the transmitted data (shown as underlined figures).

The differential encoding leads to higher rates of error than classic encoding because one transmission error corrupts two consecutive information symbols.

There is therefore a need for a novel technique of transmission implementing a differential modulation enabling the transmitted data to be reconstructed more reliably.

SUMMARY

An exemplary embodiment relates to a method for modulating a source binary sequence formed by a plurality of source words, delivering modulated symbols.

According to an embodiment of the invention, such a method implements the following steps:
  an error correction encoding of the plurality of source words, implementing one or more encoding modules, each implementing a distinct error correction code, delivering a plurality of code words; said source words being encoded successively;
  an interlacing of the code words, delivering an interlaced sequence;
  a differential modulation of the interlaced sequence, delivering modulated symbols.

Each code word is split into at least one group presenting a number of bits equal to the base-2 logarithm of a number of states of the modulation implemented during the differential modulation step. The interlacing step distributes the groups in the interlaced sequence so that two adjacent groups in the interlaced sequence belong to distinct code words.

An embodiment of the invention thus proposes a novel technique of transmission enabling the more reliable reconstructing of the transmitted data by combining the use of error correction encoding techniques and differential encoding techniques.

To this end, an embodiment of the invention relies on a breaking down into groups of the code words coming from the error correction encoding step and on a particular interlacing of these code words, delivering an interlaced sequence in which two consecutive groups of bits belong to distinct code words. It can be noted that it is possible to interlace any number whatsoever of code words according to an embodiment of the invention (two, three, four or more) provided that two adjacent groups in the interlaced sequence do not belong to the same code word.

Thus, even when a transmission error corrupts two consecutive groups of bits, these groups belong to different code words. The code words decoding performance is therefore only very slightly diminished.

In particular, each of the groups of the interlaced sequence represents a transition between two modulated symbols. Thus, the size of these groups (i.e. the number of bits per group) depends on the modulation implemented. For example, for a BPSK modulation, the number of bits per group is equal to 1; for a QPSK modulation, the number of bits per group is equal to 2; for the 8PSK modulation, the number of bits per group is equal to 3, etc. Two adjacent groups therefore correspond to two consecutive transitions, corresponding for example to consecutive phase shifts between three modulated symbols for a phase modulation.

Besides, if the number of bits forming a code word does not correspond to a multiple of the number of bits per group, it is possible to have a particular group presenting a number of bits smaller than the base-2 algorithm of the number of states of the modulation. This particular group can especially be complemented by bits equal to '0' or '1' to obtain a size equal to that of the other groups.

According to one particular aspect of an embodiment of the invention, the error correction encoding step implements at least two distinct error correction codes each delivering distinct code words.

In this case, the encoding step implements several encoding modules each implementing a distinct error correction code.

In particular, when the code words obtained by the implementation of the distinct error correction codes have a different length, the interlacing step interlaces the groups until it has distributed all the groups of the code word having the smallest length. The remaining groups are then copied out into the interlaced sequence.

Thus, two adjacent groups in the modulated sequence belong to distinct code words until all the groups of the shortest code word have been used. It is then possible that neighboring groups in the interlaced sequence belong to one and the same code word.

If the interlacing step interlaces three code words of distinct length, these three code words are interlaced until all the groups of the shortest code word (among these three code words) have been distributed, and then the remaining two code words are interlaced until all the groups of the shortest code word among these remaining two code words are distributed. Thus, only the last groups of the longest code word can possibly be neighbors in the interlaced sequence.

According to one alternative embodiment, with the code words comprising information bits and redundancy bits, each code word is split into at least one group of information bits and at least one group of redundancy bits. The interlacing step then distributes the groups of information bits in the interlaced sequence, so that two adjacent groups of information bits in the interlaced sequence belong to distinct code words.

It can be noted that according to this variant, the interlacing ensures that the neighboring groups of information bits do not belong to a same code word, whereas neighboring groups of redundancy bits (or parity bits) can belong to a same code word.

This alternative embodiment is particularly advantageous when the code words obtained by the different encoding modules have a different size (length).

It is thus possible to use error correction codes having different performance levels, and especially a first error correction code having a correction capacity greater than that of a second error correction code.

An embodiment of the invention also pertains to a computer software product downloadable from a communications network and/or recorded on a computer-readable carrier and/or executable by a processor comprising program code instructions to implement the method for modulating as described here above.

The method for modulating of an embodiment of the invention can therefore be implemented in various ways, especially in wired form or in software form.

In another embodiment, the invention pertains to device for modulating a source binary sequence formed by a plurality of source words, delivering modulated symbols, comprising:
  means for the error correction encoding of the plurality of source words, implementing one or more encoding modules, each implementing a distinct error correction code, delivering a plurality of code words, said source words being encoded successively;
  means for interlacing the code words, delivering an interlaced sequence;
  means for the differential modulation of the interlaced sequence, delivering modulated symbols.

According to an embodiment of the invention, each code word is split into at least one group having a number of bits equal to the base-2 logarithm of a number of states of a differential modulation implemented by the differential modulation means, and the interlacing means distribute the groups in the interlaced sequence so that two adjacent groups in the interlaced sequence belong to distinct code words.

A modulation device of this kind is especially adapted to implementing the method for modulating described here above. It can be integrated especially into a transmitter used for optical communications.

This modulation device could of course comprise the different characteristics pertaining to the method for modulating of an embodiment of the invention. Thus, the characteristics and advantages of this device are the same as those of the method for modulating and shall not be described in more ample detail.

An embodiment of the invention also pertains to a signal comprising modulated symbols obtained from a source binary sequence formed by a plurality of source words, having undergone, before being sent:
  an error correction encoding of the plurality of source words, implementing one or more encoding modules, each implementing a distinct error correction code, delivering a plurality of code words, said source words being encoded successively;
an interlacing of the code words, delivering an interlaced sequence;
a differential modulation of the interlaced sequence, delivering modulated symbols.
each code word being split into at least one group presenting a number of bits equal to the base-2 logarithm of a number of states of said differential modulation, and the interlacing distributing the groups in the interlaced sequence so that two adjacent groups in the interlaced sequence belong to distinct code words.

Such a signal can be formed especially by modulated symbols obtained according to the method for modulating described here above. This signal could of course comprise the different characteristics pertaining to the method for modulating according to an embodiment of the invention.

In another embodiment, the invention concerns a method for demodulating received symbols, corresponding to symbols modulated according to the method for modulating described here above after passage in a transmission channel, delivering a reconstructed binary sequence.

According to an embodiment of the invention, such a method implements the following steps:
differential demodulation of the received symbols, implementing a processing that is the inverse of the differential modulation implemented at sending side, delivering a demodulated sequence;
de-interlacing of the demodulated sequence, implementing a processing that is the inverse of the interlacing implemented at sending side, delivering a plurality of code words;
decoding of the code words, delivering the reconstructed binary sequence.

Such a method for demodulating is adapted especially to demodulating a modulated signal modulated according to the method for modulating described here above. Thus, the demodulated sequence obtained at the output of the differential demodulation step corresponds to the interlaced sequence obtained on the modulation side, affected by transmission errors if any, and can be split into groups of bits such that two consecutive groups belong to distinct code words.

In particular, the decoding step implements the following steps:
correcting, from at least one error correction code, at least one first code word comprising at least one group comprising at least one erroneous bit, called a current group, delivering a first corrected code word;
correcting, from the first corrected word, at least one distinct code word comprising a group adjacent to the current group in the demodulated sequence, called a neighboring group.

Thus, it is possible to decode certain code words in a classic way in using the error correction code or codes implemented in sending (using an algebraic decoding for the BCH or Reed Solomon type error correction codes for example, or other decoding techniques for LDPC type error correction codes for example), and deduce the decoding of the other code words therefrom.

More specifically, if an error affecting a current group is detected, the adjacent group preceding or following the current group in the demodulated sequence too is necessarily affected by errors since, when a differential encoding is used, one transmission error corrupts two consecutive groups of bits.

Now, it can be recalled that two consecutive groups in the demodulated sequence necessarily belong to distinct code words, through the specific interlacing used on the modulation side. It is therefore possible to locate and then correct the errors affecting a distinct code word once an error affecting a current group of a first code word has been detected and corrected.

According to a first alternative embodiment, the method for demodulating comprises a step for allocating a first value of confidence to the received symbol obtained from the neighboring group preceding the current group in the demodulated sequence (i.e. allocating this value to the received symbol originating the transition encoded by the current group), and a second value of confidence to the received symbol obtained from the current group (i.e. to the received symbol that is the destination of the transition encoded by the current group).

In other words, the following are characterized:
the confidence placed in the preceding neighboring group, on the basis of the received modulated symbol that is at the origin of the transition encoded by the current group, and
the confidence placed in the following neighboring group, on the basis of the received modulated symbol that is the result of (or following) the transition encoded by the current group.

The step for correcting the distinct code word is then implemented for the neighboring group preceding the current group in the demodulated sequence and/or for the neighboring group following the current group in the demodulated sequence in taking account of these values of confidence.

In particular, the values of confidence are equal to the log likelihood ratio (LLR) associated with the corresponding received symbol.

These values of confidence thus make it possible to decide whether it is the preceding neighboring group, the following neighboring group or the two neighboring groups that is (or are) probably erroneous and therefore to reduce the number of "candidate" code words associated with a code word. Thus, the speed of the decoding algorithm is increased.

In particular, the decision to correct the preceding neighboring group and/or the following neighboring group may depend on a threshold s, used to define whether the two received symbols are reliable in an equivalent way or not. If the threshold is equal to 100%, it means that the two received symbols are reliable in an equivalent way and that it is necessary to correct each of the neighboring groups. In this case, since it is sought to correct both the preceding neighboring group and the following neighboring group, it is not necessary to determine these values of confidence.

According to a second variant, the step for correcting the distinct code word comprises:
a step for determining at least one candidate code word for the distinct code word;
a step for determining the syndrome associated with the candidate code word or words;
a step for selecting the candidate code word having a zero syndrome, delivering the corrected distinct code word.

These steps make it possible especially to determine whether an error is affecting the preceding neighboring group, the following neighboring group, or both neighboring groups. It also makes it possible to reduce the number of candidate code words associated with a code word since it makes it possible to keep only the candidate code words having a zero syndrome. Thus, the speed of the decoding algorithm is increased.

The first and second variants can also be combined.

An embodiment of the invention also pertains to a computer software product downloadable from a communications network and/or recorded on a computer-readable carrier and/or executable by a processor comprising program code instructions to implement the method for demodulating as described here above.

The method for demodulating according to an embodiment of the invention can therefore be implemented in various ways and especially in wired form or software form.

In another embodiment, the invention pertains to a device for demodulating received symbols, corresponding to symbols modulated after passage in a transmission channel, delivering a reconstructed binary sequence, the modulated symbols being obtained from a source binary sequence having undergone, before being sent:

an error correction encoding of the source binary sequence, delivering a plurality of code words, an interlacing of the code words, delivering an interlaced sequence;

a differential modulation of the interlaced sequence, delivering modulated symbols.

each code word being split into at least one group presenting a number of bits equal to the base-2 logarithm of a number of states of said differential modulation, and the interlacing distributing the groups in the interlaced sequence so that two adjacent groups in the interlaced sequence belong to distinct code words.

According to an embodiment of the invention, such a device comprises:

means of differential demodulation of the received symbols, implementing a processing that is the inverse of the differential modulation implemented at sending side, delivering a demodulated sequence;

means for de-interlacing the demodulated sequence, implementing a processing that is the inverse of the interlacing implemented at sending side, delivering a plurality of code words;

means for decoding the code words, delivering the reconstructed binary sequence.

Such a device can be adapted especially to implementing the method for demodulating described here above, and to receiving symbols modulated according to the method for modulating described here above. In particular, it can be integrated into a receiver used for the optical communications.

This demodulation device could of course include the different characteristics pertaining to the method for demodulating according to an embodiment of the invention. Thus, the characteristics and advantages of this device are the same as those of the method for demodulating and shall not be described in greater detail.

BRIEF DESCRIPTION OF THE DRAWINGS

Other characteristics and advantages shall appear more clearly from the following description of a particular embodiment, given by way of a simple illustrative and non-restrictive example and from the appended figures, of which.

DETAILED DESCRIPTION OF ILLUSTRATIVE EMBODIMENTS

1. General Principle

The general principle of an embodiment of the invention relies on a specific grouping of the bits forming a code word and a specific interlacing of these groups, enabling the distribution of the groups of the different code words in an interlaced sequence so that two adjacent groups (i.e. groups side by side in the interlaced sequence) belong to distinct code words. It can be noted that these adjacent groups correspond to consecutive transitions, corresponding for example to consecutive phase shifts between the modulated symbols for a phase modulation.

In other words, an embodiment of the invention proposes to distribute the errors occurring, during transmission, in the different code words. The code words coming from the error correction encoding are therefore interlaced so as not to have two groups of bits coming from a same code word side by side. If a transmission error occurs, it thus corrupts two groups of bits side by side that belong to different code words and that are decoded by a same decoder if they come from a same error correction code (also called FEC for "Forward Error Correction") and by different decoders if they come from different error correction codes (FECs).

An embodiment of the invention thus improves the transmission performance by distributing the transmission errors between several code words through a combination of error correction encoding techniques, modulation using differential encoding and specific interlacing. Thus, the techniques of error correction encoding are adapted to the particular features of the differential encoding.

Figure 2:
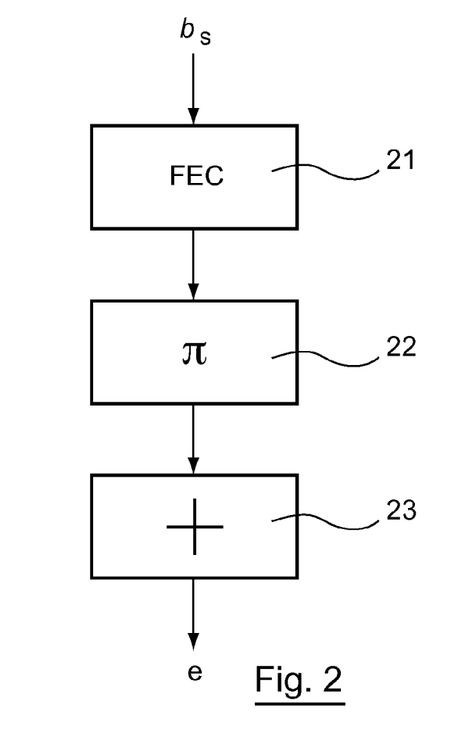
FIG. 2 illustrates the main steps implemented by the method for modulating according to one particular embodiment of the invention.

FIG. 2 illustrates the main steps implemented on the modulation side for the modulation of a source binary sequence $b_s$ formed by a succession of source words, delivering modulated symbols e, each associated with a state $\alpha_i$ of a corresponding constellation. These modulated symbols can then be transmitted through an optical communication for example, in the form of a modulated signal.

A method for modulating of this kind first of all implements an error correction encoding step 21 for correcting the source binary sequence $b_s$, also denoted as FEC, delivering a plurality of code words.

This error correction encoding step 21 is used to encode the source words of the source binary sequence $b_s$, formed by information bits, in using at least one error correction code. We thus obtain code words at output of this step 21 which include both information bits and redundancy bits.

The error correction encoding step 21 can implement one or more FEC encoding modules, each implementing a distinct error correction code delivering one or more code words. It can be noted that the number of FEC encoding modules does not depend on the number of states of the differential module (or on the constellation).

During a following interlacing step 22, the code words (two, three, four or more) are interlaced, delivering an interlaced sequence.

More specifically, the code words can be split into groups having a number of bits equal to the base-2 logarithm of the number of states of the differential modulation. It may be recalled that if the number of bits forming a code word does not correspond to a multiple of the number of bits per group, it is also possible to have a particular group having a number of bits smaller than the base-2 logarithm of the number of states of the modulation.

The interlacing step 22 then distributes the different groups so that two adjacent groups in the interlaced sequence belong to distinct code words. For example, if we consider two distinct code words, the interlaced sequence is formed by a first group of bits of the first code word, followed by a first group of bits of the second code word, followed by a second group of bits of the first code word, followed by a second group of bits of the second code word etc. It can thus be considered that the groups associated with the different code words are placed one after the other in the interlaced sequence, in alternating the groups belonging to different code words.

It can be noted that this interlacing step 22 depends on the number of states of the differential modulation. In other words, packets (groups) of several bits are interlaced, the size of which varies according to the constellation associated with the differential modulation. For example, the bits are interlaced two by two in the case of a QPSK modulation.

Finally, during a differential modulation step 23, the interlaced sequence of groups of bits is modulated, delivering modulated symbols e, each associated with a state $\alpha_i$ of the constellation. It is thus noted that each modulated symbol is built from a group of bits coming from a same code word.

It may be recalled that the interlaced sequence at input of the differential modulation step corresponds to the transitions between the modulated symbols. Each group of the interlaced sequence therefore represents a transition between two modulated symbols. Thus, the interlaced code words represent the transitions between the modulated symbols sent.

2. Examples of Implementation of the Modulation Technique

Here below, we describe a few examples of implementation of embodiments of the invention for different modulation formats, for which the number of bits per group is greater than or equal to two.

Figure 3A:
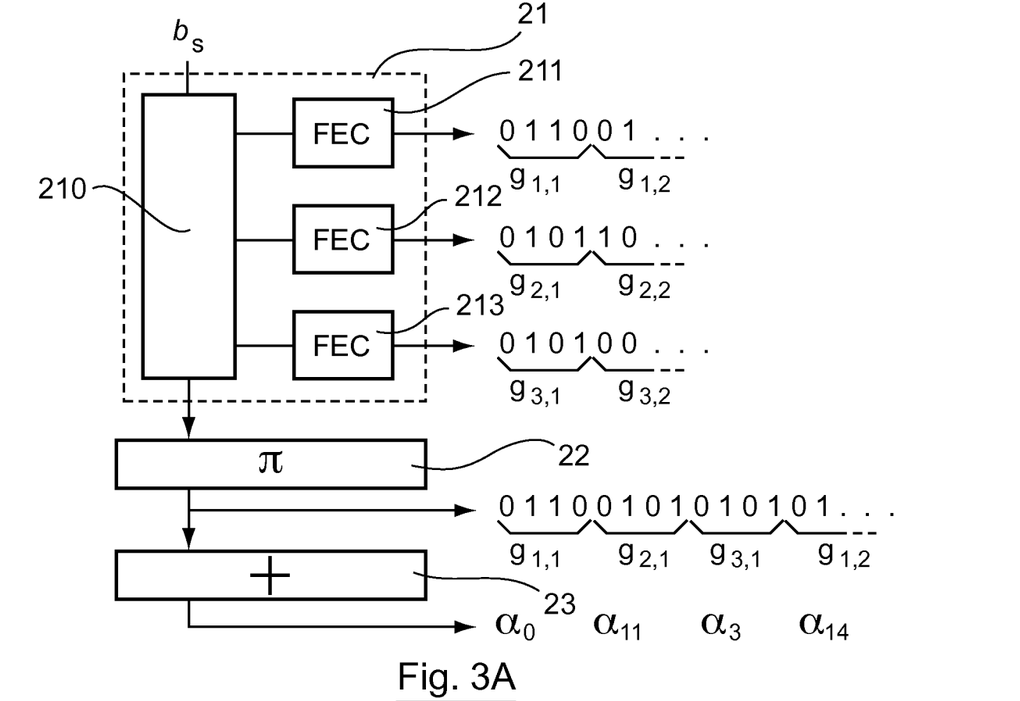
FIGS. 3A to 3C show three examples of implementation of the method for modulating according to FIG. 2.

More specifically, FIG. 3A illustrates the main steps implemented for a 16-state amplitude modulation (16QAM modulation).

As indicated here above, the source words of the binary sequence $b_s$ are successively encoded during the error correction encoding step 21. It is taken, for example, that this encoding step implements three FEC encoding modules 211, 212, 123, each implementing a distinct error correction code delivering code words of identical size.

For example, the first FEC encoding module 211 delivers a first code word '011001 ... ', then the second FEC encoding module 212 delivers a second code word '010110 ... ', then the third FEC encoding module 213 delivers a third code word '010100 ... '. In other words, a single encoding module is used at a given point in time. The block 210 can therefore be seen as a selector of the FEC encoding module to be used to encode a source word.

It may be recalled that the number of FEC encoding modules does not depend on the number of states of the differential modulation and that the code words coming from the different encoding modules can be of different sizes.

These code words are then interlaced during an interlacing step 22.

More specifically, it may be recalled that, according to an embodiment of the invention, the code words can be split into groups having a number of bits equal to the base-2 logarithm of a number of states of the differential modulation, i.e. groups of four bits for a 16QAM modulation. The size of a group, also called a symbol (information or redundancy symbol) therefore depends on the constellation.

Thus, the following are defined: a first group in the first code word, denoted $g_{1,1}$, comprising the bits '0110', a second group in the first code word, denoted $g_{1,2}$, comprising the bits '01.', a first group in the second code word, denoted $g_{2,1}$, comprising the bits '0101', a second group in the second code word, denoted $g_{2,2}$, comprising the bits '10.', a first group in the third code word, denoted $g_{3,1}$, comprising the bits '0101', a second group in the third code word, denoted $g_{3,2}$, comprising the bits '00.', etc.

These groups are then interlaced so that two adjacent groups do not belong to the same code word.

For example, the interlaced sequence comprises the following successive groups: $g_{1,1}, g_{2,1}, g_{3,1}, g_{1,2}$, etc. According to one variant, the interlaced sequence comprises the following successive groups: $g_{1,1}, g_{3,1}, g_{2,1}, g_{1,2}$, etc. According to another variant, the interlaced sequence comprises the following successive groups: $g_{2,1}, g_{1,1}, g_{3,1}, g_{2,2}$, etc. The essential point is that the two consecutive groups in the interlaced sequence do not belong to a same code word.

It can be noted that the interlacing of groups belonging to three different code words improves certain performance levels. It can be recalled indeed that two transmission errors generally produce three erroneous groups (or information or redundancy symbols). Thus, by using three code words, two successive transmission errors can be better corrected. Indeed, these three groups, according to an embodiment of the invention, are distributed over three different code words. It can be noted that with an interlacing of two code words only and two transmission errors, one of the code words would have only one group of erroneous bits and the other code word would have two groups of erroneous bits. It is therefore possible, according to an embodiment of the invention, to use an interlacing on more than two code words.

The interlaced sequence thus obtained is then modulated during the differential modulation step 23 delivering modulated symbols associated for example with the points $\alpha_0 \, \alpha_{11} \, \alpha_3 \, \alpha_{14}$ of the constellation. It is during this differential modulation step 23 that classic operations of series/parallel conversion of the interlaced sequence and operations of distribution on an in-phase path and an in-quadrature path are performed.

Figure 3B:
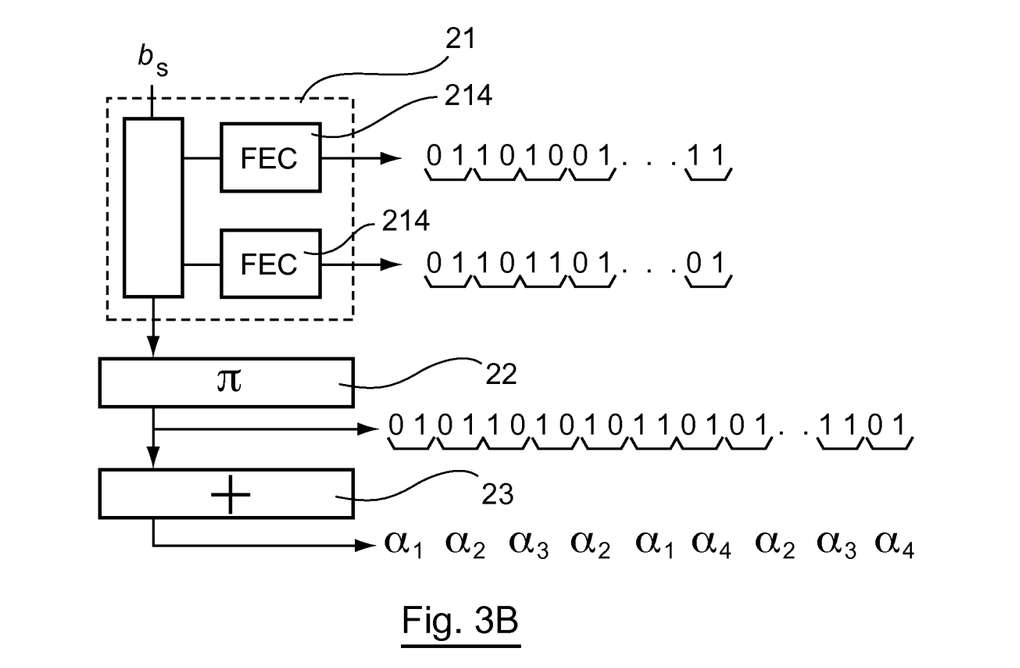

Here below, referring to FIG. 3B, we present the main steps implemented for a four-state phase modulation (QPSK modulation).

As indicated here above, several code words are delivered during the error correction encoding step 21. It is considered for example that this encoding step implements a single FEC encoding module 214 delivering at least two code words. According to the example illustrated in FIG. 3B, this FEC encoding module 214 first of all encodes a first source word of the binary sequence $b_s$ and delivers a first code word comprising information bits '01101001 ... ' and redundancy bits '11'. The FEC encoding module 214 then encodes a second source word of the binary sequence $b_s$ and delivers a second code word comprising information bits '01101101 ... ' and redundancy bits '01'.

These code words are then interlaced during an interlacing step 22.

To this end, the code words coming from the single FEC encoding module 214 are both memorized. The code words are then split into groups having a number of bits equal to the base-2 logarithm of a number of states of the differential modulation, i.e. into two bit groups for a QPSK modulation.

The first code word thus includes the groups '01', '10', '10', '01', . . . (comprising information bits) and '11' (comprising redundancy bits). The second code word comprises the groups '01', '10', '11', '01', . . . (comprising information bits) and '01' (comprising redundancy bits). These groups are then interlaced so that two adjacent groups do not belong to the same code word.

For example, the interlaced sequence comprises the following successive groups: '01', '01', '10', '10', '10', '11', '01', '01', . . . , '11', '01'.

It is thus possible to use a single encoding module if we wish to obtain several code words by using the same error correction code.

The interlaced sequence thus obtained is then modulated during the differential modulation step 23, delivering the modulated symbols associated with the points $\alpha_1\ \alpha_2\ \alpha_3\ \alpha_2\ \alpha_1\ \alpha_4\ \alpha_2\ \alpha_3\ \alpha_4$ of the constellation.

Figure 3C:
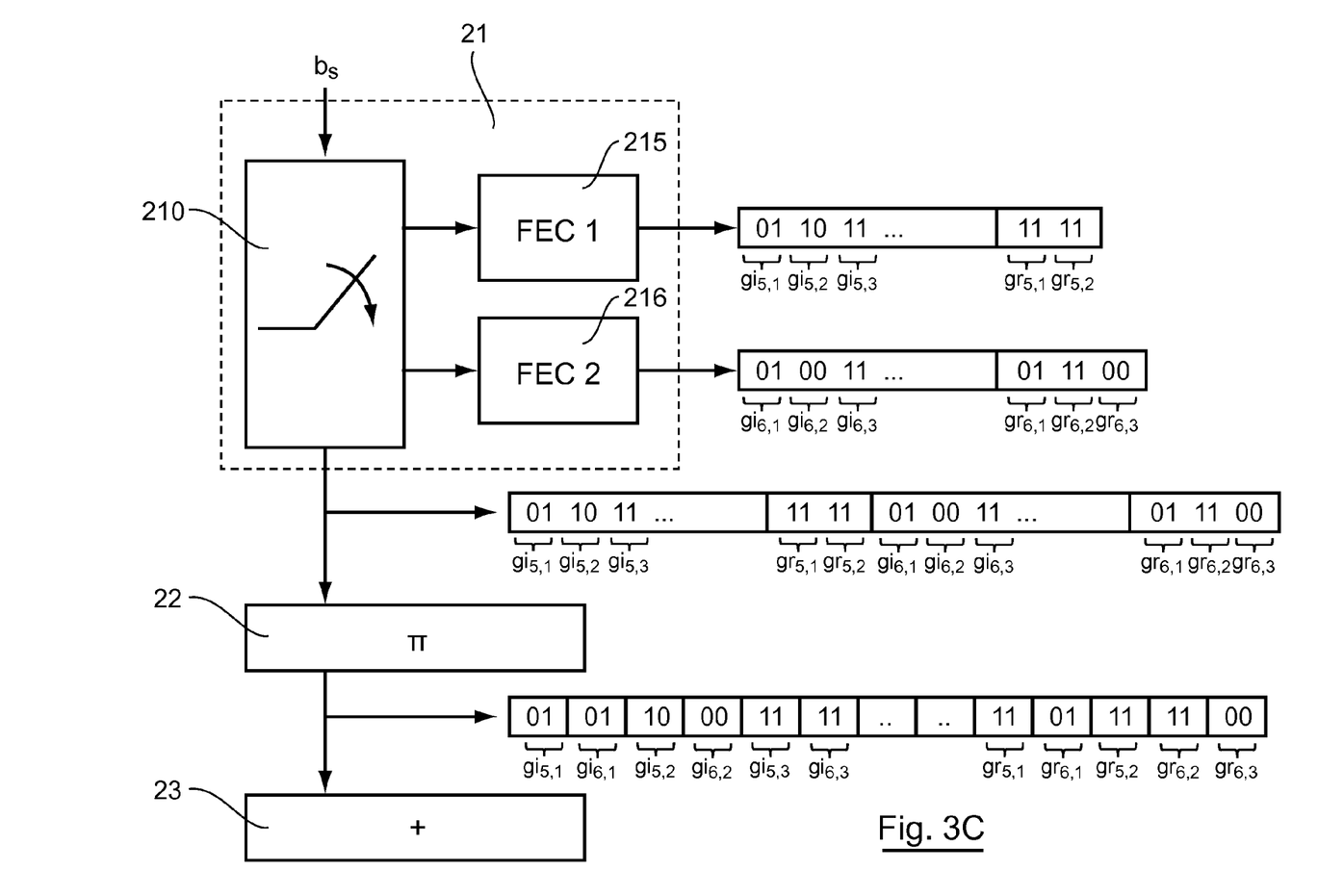

Referring now to FIG. 3C, we present an alternative embodiment according to which the error correction encoding step 21 implements two encoding modules, FEC1 referenced 215 and FEC2 referenced 216, each implementing a distinct correction code generating code words of distinct length.

According to a first example, the first encoding module FEC1 215 implements a BCH (1022, 842) code and the second encoding module FEC2 216 implements a BCH (942, 842) code. In this example, the code words coming from the encoding modules FEC1 215 and FEC2 216 therefore have a different length but a same number of information bits.

According to this example, and as described here above, the source words of the binary sequence $b_s$ are successively encoded during the error correction encoding step 21. For example, the first encoding module FEC1 215 delivers a first code word comprising the information bits '011011 . . . ' and the redundancy bits '1111', then the second encoding module FEC2 216 delivers a second code word comprising the information bits '010011 . . . ' and the redundancy bits '011100'.

These code words are, according to this variant, split into groups of information bits and groups of redundancy bits. For example, if we again consider a QPSK modulation, the code words are split into groups of information bits and groups of redundancy bits of two bits each.

Thus, in the first code word, the following are defined:
a first group of information bits, denoted as $gi_{5,1}$, comprising the bits '01';
a second group of information bits, denoted as $gi_{5,2}$, comprising the bits '10';
a third group of information bits, denoted as $gi_{5,3}$, comprising the bits '11';
etc;
a first group of redundancy bits, denoted as $gr_{5,1}$, comprising the bits '11';
a second group of redundancy bits, denoted as $gr_{5,2}$, comprising the bits '11'.
and in the second code word:
a first group of information bits, denoted as $gi_{6,1}$, comprising the bits '01';
a second group of information bits, denoted as $gi_{6,2}$, comprising the bits '00';
a third group of information bits, denoted as $gi_{6,3}$, comprising the bits '11';
etc;
a first group of redundancy bits, denoted as $gr_{6,1}$, comprising the bits '01';
a second group of redundancy bits, denoted as $gr_{6,2}$, comprising the bits '11';
a third group of redundancy bits, denoted as $gr_{6,3}$, comprising the bits '00'.

At the end of the encoding step 21, we therefore obtain an encoded sequence formed by the two code words coming from the encoders FEC1 215 and FEC2 216.

In this alternative embodiment, the groups are then interlaced during the interlacing step 22 so that two adjacent groups of information bits do not belong to the same code word. The groups of redundancy bits can also be interlaced.

The interlaced sequence thus obtained comprises for example the following successive groups: $gi_{5,1}$, $gi_{6,1}$, $gi_{5,2}$, $gi_{6,2}$, $gi_{5,3}$, $gi_{6,3}$, . . . , $gr_{5,1}$, $gr_{6,1}$, $gr_{5,2}$, $gr_{6,2}$, $gr_{6,3}$.

The interlacing step therefore ensures that the neighboring groups of information bits do not belong to a same code word while the neighboring groups of redundancy (or parity) bits can belong to a same code word.

According to this first example, since the second encoder FEC2 216 delivers code words having a length greater than that of the code words delivered by the first encoder FEC1 215, several groups of redundancy bits belonging to the second code word follow one another in the interlaced sequence ($gr_{6,2}$, $gr_{6,3}$).

The interlaced sequence thus obtained is then modulated during the differential modulation step 23.

According to a second example, the first encoding module FEC1 215 implements a BCH (1022, 982) code and the second encoding module FEC2 216 implements a BCH (942, 862) code. In this example, the code words coming from the encoding modules FEC1 215 and FEC2 216 therefore have different lengths and a different number of information bits.

In this case, the interlacing ensures that the neighboring groups in the interlaced sequence do not belong to a same code word until all the groups of the shortest code word have been used. The remaining groups of the longest code word are then copied out into the interlaced sequence and can therefore become neighbors again in the interlaced sequence.

In this second example, if, at the end of the encoding step 21, we obtain a first code word formed by the groups $gi_{5,1}$, $gi_{5,2}$, . . . , $gi_{5,N}$, $gr_{5,1}$, $gr_{5,2}$ and a second code word formed by the groups $gi_{6,1}$, $gi_{6,2}$, . . . , $gi_{6,N}$, $gi_{6,N+1}$, $gi_{6,N+2}$, $gr_{6,1}$, $gr_{6,2}$, $gr_{6,3}$. The interlaced sequence obtained at the end of the interlacing step 22 comprises the following successive groups:

$gi_{5,1}$, $gi_{6,1}$, $gi_{5,2}$, $gi_{6,2}$, . . . , $gi_{5,N}$, $gi_{6,N}$, $gr_{5,1}$, $gi_{6,N+1}$, $gr_{5,2}$, $gi_{6,N+2}$, . . . , $gr_{6,1}$, $gr_{6,2}$, $gr_{6,3}$. Until all the groups of the shortest code word have been exhausted (first code word), the successive groups of the interlaced sequence therefore belong to different code words; then (i.e. starting from the group $gi_{6,N+2}$), the successive groups of the interlaced sequence can belong to a same code word (second code word). It is noted that these latter groups can include only redundancy bits or else information bits and redundancy bits.

In the case of a two-state modulation, such as the DBPSK modulation, the size of a group is equal to one bit, which amounts to bringing about a bit-by-bit interlacing. In order to correct the transmission errors more easily, it is still necessary according to an embodiment of the invention to apply a specific law of interlacing, enabling the bits to be distributed so that two consecutive bits do not belong to a same code word. The use of a classic bit-by-bit interlacing is, on the contrary, not optimal for reducing the defects of differential encoding since it does not necessarily make it possible to distribute the errors over different code words.

Finally, it is noted that an error correction code C(n,k,t), which delivers n-sized code words from k information bits and corrects up to t transmission errors combined with a specific interlacing and a differential encoding according to an embodiment of the invention, shows the same performance in terms of error correction rate as an error correction encoding C(2n,2k,2t) without interlacing. Interlacing truly offers encoding gain, and does so whatever the type of modulation used.

Figure 4:
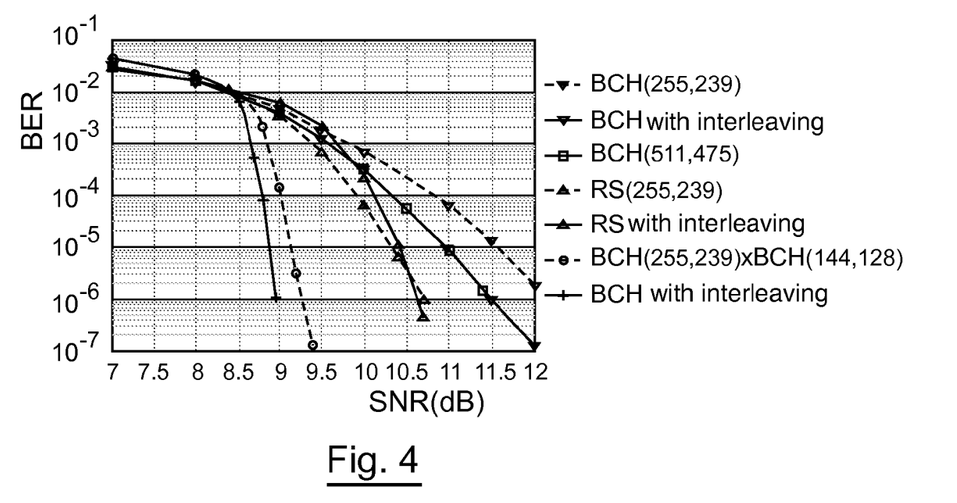
FIG. 4 illustrates the performance of an embodiment of the invention relatively to the techniques of the prior art.

FIG. 4 thus illustrates the performance characteristics of an embodiment of the invention for a QPSK type modulation in comparing the binary error rate (BER) as a function of the signal-to-noise ratio (SNR) in dB, for different types of error correction encoding combined with a specific interlacing according to an embodiment of the invention, or without interlacing according to the prior art.

It can be noted that the performance is remarkable when the error correction encoding step implements a binary error correction code such as the BCH (255,239) code or the product code BCH (255,239)×BCH (144,128) (with hard decision decoding). When the error correction encoding step implements a non-binary error correction code such as the Reed Solomon (RS), the size of the code word influences the benefits of the interlacing.

Naturally, this technique can be extended to a greater number of code words, and to different sizes of differentially modulated constellation.

3. Working of the Demodulation Technique

Figure 5:
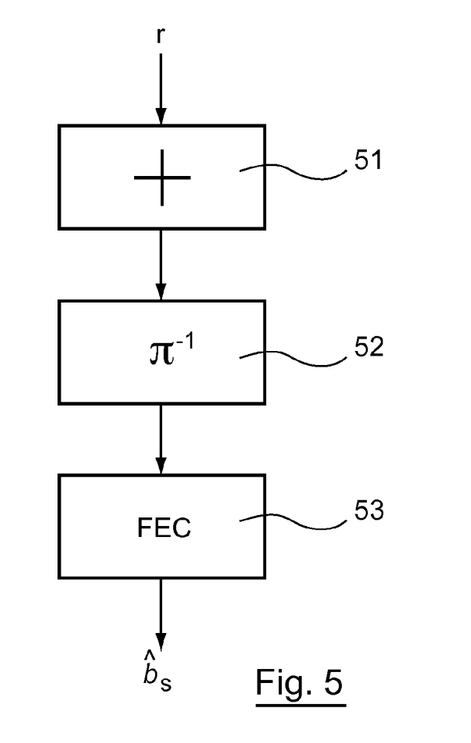
FIG. 5 illustrates the main steps implemented by the method for demodulating according to one embodiment of the invention.

FIG. 5 illustrates the main steps implemented on the demodulation side for the demodulation of received symbols r corresponding to modulated symbols e after passage into a transmission channel, delivering a reconstructed binary sequence $\hat{b}_s$.

These received symbols r may be disturbed by the transmission channel or the receiver itself (additive Gaussian white noise, distortion, phase noise, interference etc). We then estimate the point $\alpha_i$ that is closest to the constellation which corresponds to the received symbol. An error appears if the disturbances are such that the received symbol approaches a point of the constellation that differs from the point corresponding to the modulated symbol sent.

A method for demodulating of this kind is adapted especially to receiving a signal formed by modulated symbols coming from the above-described method for modulating.

More specifically, such a method first of all implements a step for the differential demodulation 51 of the received symbols, implementing a processing inverse to the differential modulation 23 implemented when sending, to deliver a demodulated sequence. If we consider a phase modulation implemented at sending side for example, it is possible to measure the phase shift between each received symbol at reception and retrieve the transitions and the groups of bits encoding these transitions.

The demodulated sequence is therefore formed by successive groups of bits since, during the differential modulation, each transition is encoded by a group of bits. As a result of the specific interlacing implemented at sending side, two groups of successive bits belong to different code words.

The demodulated sequence is then de-interlaced during a de-interlacing step 52 implementing a processing inverse to the interlacing 22 implemented at sending side, to deliver a plurality of code words.

The code words obtained are then decoded during a decoding step 53, delivering the reconstructed binary sequence $\hat{b}_s$.

Given that the demodulated sequence has a specific structure, according to which two consecutive groups do not belong to a same code word, it is possible to reduce the decoding complexity.

Indeed, it is possible, according to an embodiment of the invention, to classically decode certain code words and use these corrected code words to decode other code words.

The term "classic decoding" is understood to mean an algebraic decoding for BCH or Reed Solomon type error correction codes for example or other classic decoding techniques for LDPC type error correction codes for example.

Thus, the decoding step 53 performs for example a correction of at least one code word in using a decoding that corresponds to the encoding used at sending side, to deliver a corrected code word and a correction of at least one code word distinct, using the previously corrected code word.

Indeed, it may be recalled that the errors occur always at least in pairs in a differential encoding. Thus, if we localize an error in a group of bits of a first code word, using a classic error detection/correction algorithm, here below called a current group, then the adjacent group preceding or following the current group in the demodulated sequence, called a neighboring group, is necessarily also affected by errors. Furthermore, owing to the specific function of interlacing implemented according to an embodiment of the invention, it is ensured that the two groups affected by errors (current group and neighboring group) belong to distinct code words. Finally, knowing the value of the error on the current group makes it possible to deduce the value of the error in the neighboring group.

It is thus possible to localize and correct the errors affecting a second code word, when the errors affecting a first code word are known.

Thus, if the demodulated sequence is taken to include two interlaced code words, it is possible to classically decode only one code word out of two and thereby deduce the correction to be made on the second code word. It is thus possible to reduce the decoding complexity by two.

4. Example of Implementing the Demodulation Technique

Here below, referring to FIG. 6, we present an example of an implementation of the decoding step 53 during the demodulation of received symbols, corresponding to modulated symbols having undergone an error correction encoding delivering two code words, an interlacing and a QPSK-type four-state phase modulation as presented with reference to FIG. 3B.

At the end of the differential demodulation step 51, the demodulated sequence obtained is considered to be formed by the following successive groups: '01', '01', '10', '0̱0', '1̱1', '11', '01', '01', . . . , '11', '01'. This sequence is formed by groups of bits such that two consecutive groups belong to different code words. It may be recalled that the sequence interlaced at the end of the interlacing step 22 implemented on the modulation side includes the following successive groups: '01', '01', '10', '10', '10', '11', '01', '01', . . . , '11', '01' (see FIG. 3B).

At the end of the de-interlacing step 2, we obtain the following two code words:

first code word: '01', '10', '11', '01', . . . , '11';
second code word: '01', '00', '11', '01', . . . , '01'.

These code words are then decoded during a decoding step 53.

To this end, a classic FEC decoding technique 531 is used to decode the first code word and then the result of this classic decoding is used to locate and correct 532 the errors of the second code word. It is therefore not necessary to reiterate all the classic decoding computations for the second code word.

More specifically, when the FEC decoding module 531 has detected and corrected an error in the first code word affecting a group of bits known as a current group, it is certain that a group adjacent to this current group in the demodulated sequence, belonging therefore to the second code word, is also erroneous. Referring to FIG. 6, when the FEC decoding module 531 has detected an error affecting the current group $g_c$ ('11'), the preceding neighboring group $g_{vp}$ ('00') and/or the next neighboring group $g_{vs}$ ('11') therefore has at least one error.

Here below, we present different techniques for determining whether the error affects the preceding neighboring group $g_{vp}$ ('00'), the next neighboring group $g_{vs}$ ('11'), or both these neighboring groups. These different techniques may be combined.

According to a first technique, the reliability of the received symbols is computed to know whether it is necessary to correct each of the neighboring groups or just the least reliable of them. This decision is made by fixing a threshold s to define whether the two received symbols are reliable or not reliable in an equivalent way. The value of this threshold s influences the complexity of the decoding.

Thus, a first value of confidence is assigned to the received symbol obtained from the preceding neighboring group $g_{vp}$ ('00'), corresponding to the point $\alpha_2$ of the constellation according to our example and a second value of confidence is assigned to the received symbol obtained from the current group $g_c$ ('11'), corresponding to the point $\alpha_4$ of the constellation according to our example.

For example, these values of confidence are determined from the log likelihood ratio or LLR associated with the corresponding received signal:

$$LLR = \log \frac{P(e = \alpha_r | r)}{P(e \neq \alpha_r | r)}$$

where e is the symbol sent (also called a modulated symbol in the description), r is the QPSK symbol received and $\alpha_r$ is the point of the constellation corresponding to the received symbol.

If the values of the log likelihood ratio are considered to be standardized, this predetermined threshold s can be expressed as a percentage. In this case, if the threshold is equal to 100%, it means that the two received symbols are reliable in an equivalent way and no decision is taken. It is therefore taken that each of the neighboring groups must be corrected. If the threshold is equal to 0%, it means that a "hard" decision is taken and that one received symbol is more reliable than another. It is therefore taken that only the neighboring group leading to the lowest log likelihood ratio value needs to be corrected. In this case, the correction of second code word is implemented for the neighboring group $g_{vp}$ ('00') preceding the current group $g_c$ ('11') in the demodulated sequence if the first confidence value is smaller than the second confidence value or it is implemented for the neighboring group $g_{vs}$ ('11') following the current group $g_c$ ('11') in the demodulated sequence if the second confidence value is smaller than the first confidence value.

According to our example, the threshold is taken to be equal to 0%. The first confidence value is also taken to be smaller than the second confidence value. It is therefore the preceding neighboring group $g_{vp}$ ('00') that has an error.

To know which correction must be applied once it has been determined that at least one error is affecting the preceding neighboring group $g_{vp}$ ('00'), the operation is based on a pre-established list of configurations of errors, and all the possible configurations are tried out.

To prepare this list of configurations of errors, it is taken that each transition can be measured in number of quadrants for a QPSK modulation. Thus, the group of bits '01' corresponds for example to a '1' quadrant transition. It is therefore possible to measure the errors in number of quadrants. For example, the reception of the group '11', corresponding to a two-quadrant transition, instead of the group '01', corresponding to a one-quadrant transition, corresponds to an error of '−1' quadrant.

If $Nerr_i$ denotes the $i^{th}$ error, in number of quadrants, produced by k consecutive transmission errors, we have:

$$\sum_{i=1}^{k+1} Nerr_i = 0 \bmod(4)$$

We thus obtain the following configurations for a transmission error (k=1) and two successive transmission errors (k=2):

| K | $Nerr_1$ | $Nerr_2$ | $Nerr_3$ |
|---|---|---|---|
| 1 | +1 | −1 | |
| | −1 | +1 | |
| | +2 | −2 | |
| 2 | +1 | +1 | +2 |
| | +2 | +1 | +1 |
| | −1 | −1 | +2 |
| | +2 | −1 | −1 |
| | +1 | +2 | −1 |
| | −1 | +2 | +1 |
| | +2 | 0 | +2 |
| | +1 | 0 | −1 |
| | −1 | 0 | +1 |

If only one transmission error (k=1) is considered, only one correction is possible for the second code word according to our example. Thus, if the FEC decoding module 531 has found a +1 quadrant error in the current group (reception of the group '11' instead of the group '10'), then the error on the preceding neighboring group $g_{vp}$ is a −1 quadrant error (reception of the group '00' instead of the group '10'). Indeed, the sum of the errors must be equal to 0. The correction applied to the second code word therefore corresponds to the reverse of the one applied to the first code word through the classic decoding (algebraic or other decoding).

In the case of successive transmission errors(k≥2), several error configurations are possible and the complexity of the decoding increases. A study is then made of the possible corrections that could be applied to the second code word from the list of error configurations. Thus, a set of "candidate" code words is defined for the second code word. Studying these candidate code words avoids the use of a classic decoding of the second code word.

More specifically, in order to determine a "valid" code word from among all the candidate code words, i.e. a code word that corresponds to the right correction, the syndrome of each candidate code word is computed. For example, such a syndrome could be determined by using the technique described by J. G. Proakis in "*Digital Communications*" (third edition, New York: McGraw-Hill, 1989). For example, for an FEC encoding module implementing a Reed Solomon, BCH, LDPC, or other type of linear blockwise code, each code word c must be orthogonal to the parity control matrix H of the code: $c \cdot H^T = 0$. The syndrome associated with this encoding module is therefore $synd = c \cdot H^T$.

If the syndrome obtained is zero for a candidate code word, it means that the candidate code word is a valid code word.

Therefore, the second code word is corrected by replacing it by the valid candidate code word.

If no syndrome equal to 0 is found for the different candidate code words, it means that no code word is valid. In other words, none of the proposed corrections is correct. Then, the second code word is decoded by using a classic FEC decoding technique.

According to a second technique, it is also possible to determine whether an error affects the preceding neighboring group $g_{vp}$ ('00'), the following neighboring group $g_{vs}$ ('11') or both these neighboring groups by directly using the syndrome technique.

Thus, with the error affecting the current group being known, for example equal to +1, it is known that the error affecting the preceding neighboring group $g_{vp}$ ('00') or the following neighboring group $g_{vs}$ ('11') is equal to −1. We then determine a set of candidate code words by modifying the values of the bits of the preceding neighboring group $g_{vp}$ and/or the following neighboring group $g_{vs}$ in the second code word in order to obtain an error equal to −1. Then, from among the candidate code words, we select that code word, if any, that presents a syndrome equal to 0.

In order to reduce the number of candidate code words, it is possible to combine this second technique with the first technique by allocating confidence values to the received symbols as described here above.

Finally, the decoding algorithm according to an embodiment of the invention implements the following steps:
  classic decoding of the first code word;
  if the second code word is valid:
    the decoding algorithm is stopped;
  if not:
    the possible error configurations are tested by using candidate code words;
    if there is a valid candidate code word:
      the decoding algorithm is stopped;
    if not:
      a classic decoding of the second code word is implemented.

Figure 6:
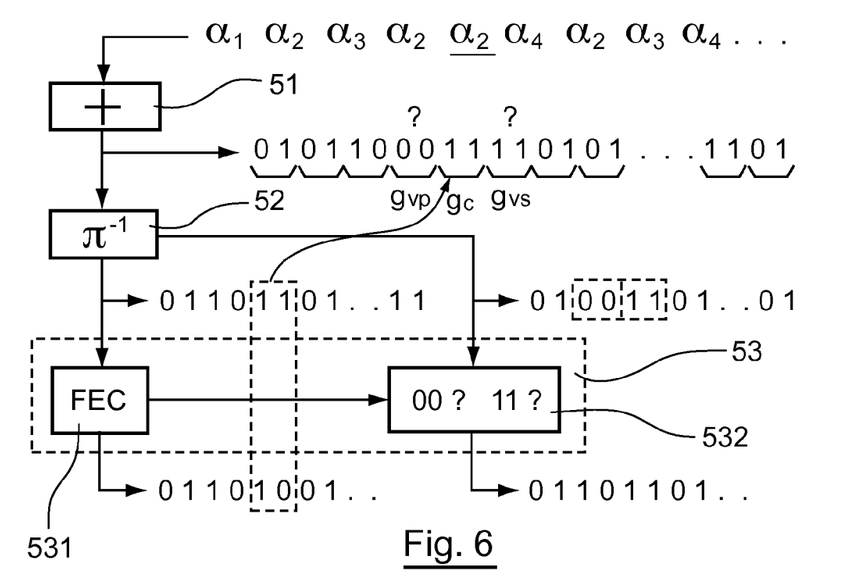
FIG. 6 shows an example of implementation of the method for demodulating according to FIG. 5.

Besides, referring to FIG. 6, a description has been provided of an example of implementation of the decoding step 53 during the demodulation of received symbols corresponding to modulated symbols that have undergone an error correction encoding delivering two code words, an interlacing and a QPSK modulation.

Naturally, the technique of decoding with reduced complexity according to an embodiment of the invention can be implemented whatever the number of code words delivered by the error correction encoding on the sending side.

Thus, if we consider an error correction encoding delivering three code words and an interlacing of these three code words according to an embodiment of the invention, it is possible classically to decode two code words out of three and, from this, to deduce the decoding of the third code word. The decoding complexity in this case is reduced by a third. It can be noted, to this end, that all the configurations of two successive transmission errors can be detected and corrected.

If we consider an error correction encoding delivering four code words and an interlacing of these four code words according to an embodiment of the invention, it is possible to decode classically two code words out of four. It is then possible to make the decoding of a third code word conditional on the fact of finding a valid code word for this third code word. Thus, if there is a valid code word available, then the third code word and then the fourth code word are decoded by taking account of the corrections made to the first and second code words. If there is no valid code word available, the third code word is decoded classically and it is sought to decode the fourth code word in taking account of the corrections made to the first, second and third code words.

Thus, it can be noted that the interlacing of several code words offers the possibility of directly detecting and correcting many error configurations.

In particular, the complexity of the proposed algorithm depends both on the number of syndromes computed and the number of decoding operations performed, depending on the number of interlaced code words.

Figure 7A:
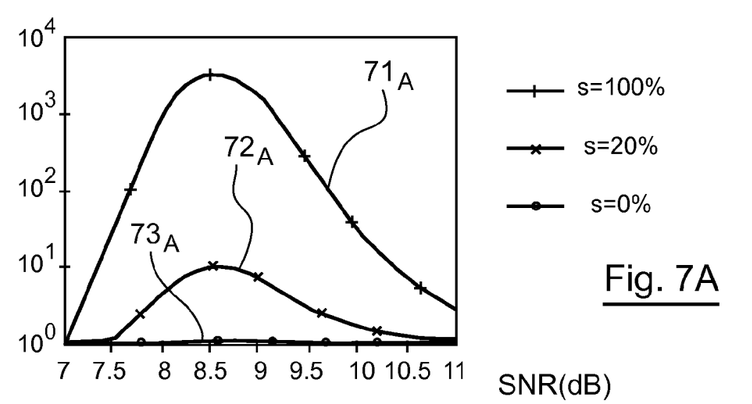
FIGS. 7A and 7B represent the complexity of the decoding algorithm as a function of the number of syndromes computed and the number of decodings performed on an average for a second code word.
Figure 7B:
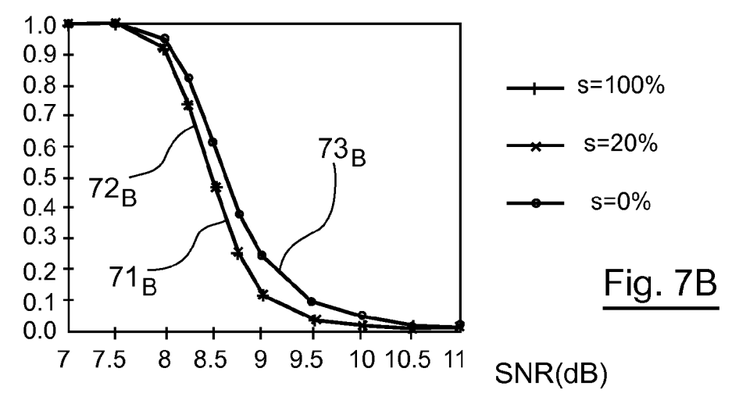

FIGS. 7A and 7B illustrate the number of syndromes computed (FIG. 7A) and the number of decodings performed (FIG. 7B) on an average for the second code word (should only two code words be interlaced) as a function of the signal-to-noise ratio (SNR) for a BCH (1023, 883) type error correction code, delivering two code words and a QPSK type modulation and for different threshold levels s for the confidence value:
  s=100%, curves $71_A$ and $71_B$;
  s=20%, curves $72_A$ and $72_B$;
  s=0%, curves $73_A$ and $73_B$;

It can be seen in these curves that, for a high SNR and a threshold of 0%, i.e. when it is chosen to correct the group of bits corresponding to the least reliable QPSK symbol, the number of syndromes and classic decodings is negligible.

Hence only one classic decoding is done for the first code word and, from this, the second code word is deduced directly, and this corresponds to a reduction of 50% of the decoding complexity relatively to the prior-art classic approaches.

It can also be noted that, since it is always possible to carry out a classic decoding of the second code word if no valid code word is found, there is no loss of gain accompanying the reduction of complexity.

The solution proposed by an embodiment of the invention thus gives significant gain in encoding and a reduction of complexity that can go up to 50%, which is a considerable advantage in the case of optical transmission at very high bit rates in particular. This solution relies on the implementation of a differential modulation and can therefore be transposed to any family of error correction codes and all sizes of constellation.

5. Reduction of Redundancy

The decoding algorithm proposed here above shows how the decoding of a first code word makes it possible to totally deduce the decoding of a second code word. It therefore does not appear to be necessary to encode the information bits corresponding to the second code word and to add redundancy bits thereto if these redundancy bits are not used for the decoding.

Nevertheless, in certain situations, the classic decoding of the second code word must be done (when no valid code word has been found). It therefore appears to be preferable to encode the information bits.

It is therefore proposed, according to a specific characteristic of an embodiment of the invention, to implement distinct error correction codes, each delivering a distinct code word. The interlaced code words can thus come from FEC encoding modules implementing different error correction codes, and generating code words of different size (having varying degrees of redundancy).

According to this particular characteristic, the error correction code used in the second encoding module is less powerful than the one used in the first encoding module and therefore generates fewer redundancy bits.

Thus, if $C_1(n_1, k_1)$ denotes the code used in the first encoding module (first code) and $C_2(n_2, k_2)$ denotes the code used in the second encoding module (second code) with $n_2 > n_1$, then the total redundancy (in number of redundancy bits relatively to the total number of bits) is defined by:

$$r = \frac{(n_1 + n_2) - k_1 - k_2}{n_1 + n_2}.$$

We also have $r < r_1$, with $$r_1 = \frac{n_1 - k_1}{n_1}$$

which would correspond to the total redundancy if the first and second encoding modules were identical.

It is noted that the second code, which is less powerful, cannot decode errors as well as the first code. The result of this therefore is an error floor if a classic decoding of the second code word is implemented.

To lower this error floor, we must consider the greatest possible number of errors configuration, such as for example the configurations of two successive errors listed here above (k=2).

It can also be noted that even if none of the corrections proposed makes a code word valid, one of the corrections must be close to the right correction. Hence, a classic decoding is made on the correction which seems to be the most probable correction, for example the one that corresponds to the least reliable QPSK symbols. We thus consider an algorithm in two runs, comprising a first run during which certain errors of the second code word are corrected in deducing them from the correction of the first code and then a second run during which a classic decoding is used to correct the errors remaining after the first run.

The correction capacity needed for the second encoding module generating the second code word therefore depends on the number of errors remaining after the first run (missed errors) and therefore on the quality of the decoding.

6. Simplified Structure of the Corresponding Modulation and Demodulation Devices Finally, referring to FIGS. 8A and 8B, we present the simplified structure of a modulation device and a demodulation device respectively implementing a technique of modulation and a technique of demodulation according to one of the embodiments described here above.

Figure 8A:
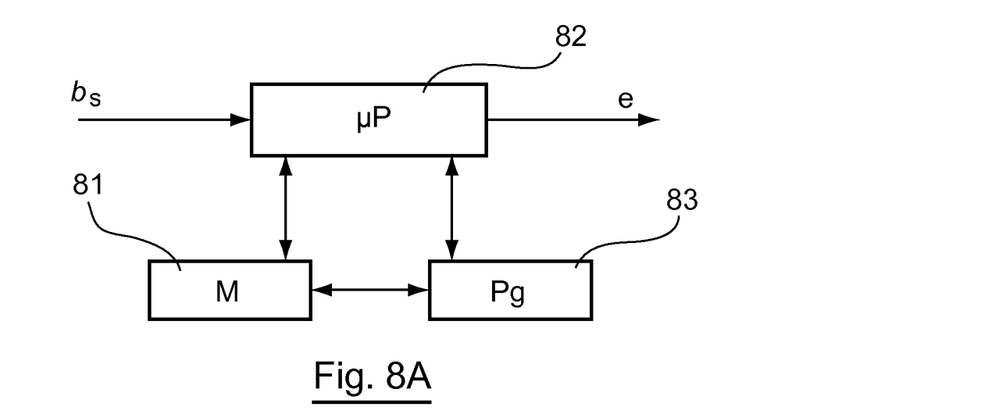
FIGS. 8A and 8B illustrate the simplified structures of a modulation device and a demodulation device according to one particular embodiment of the invention.

Such a modulation device comprises a memory 81, a processing unit 82, equipped for example with a microprocessor µP, and driven by the computer program 83 implementing the method for modulating according to an embodiment of the invention. At initialization, the code instructions of the computer program 83 are for example loaded into a RAM and then executed by the processor of the processing unit 82. The processing unit 82 inputs a source binary sequence $b_s$ formed by a plurality of source words. The microprocessor of the processing unit 82 implements the steps of the method for modulating described here above according to the instructions of the computer program 83 to encode, interlace and modulate the source binary sequence and send out modulated symbols e. To this end, the modulation device includes, in addition to the buffer memory 81, means for error correction encoding of the plurality of source words, to deliver a plurality of code words, means for interlacing code words, to deliver an interlaced sequence and means of differential modulation of the interlaced sequence, delivering modulated symbols as described here above. These means are driven by the microprocessor of the processing unit 82. The processing unit 82 therefore, through a transmission channel, sends a modulated signal to a receiver, the modulated signal comprising modulated symbols.

Figure 8B:
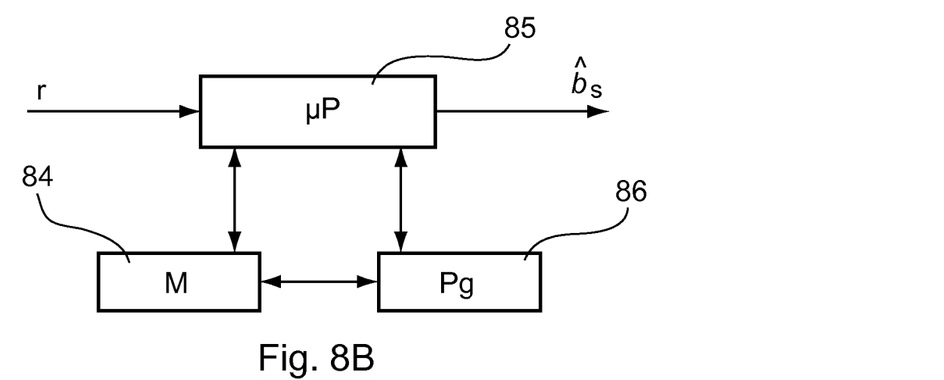

The demodulation device of FIG. 8B comprises, for its part, a memory 84, a processing unit 85 equipped for example with a microprocessor µP, and driven by the computer program 86 implementing the method for demodulating according to an embodiment of the invention. At initialization, the code instructions of the computer program 86 are for example loaded into a RAM and then executed by the processor of the processing unit 85. The processing unit 85 inputs received symbols r. The microprocessor of the processing unit 85 implements the steps of the method for demodulating described here above according to the instructions of the computer program 86, to demodulate, de-interlace, decode the received symbols r, and reconstruct a binary sequence $\hat{b}_s$. To this end, the demodulation device comprises, in addition to the buffer memory 84, means of differential demodulation of the received symbols, to deliver a demodulated sequence, means for de-interlacing the demodulated sequence, to deliver a plurality of code words, and means for decoding code words, delivering the reconstructed binary sequence as described here above. These means are driven by the microprocessor of the processing unit 85.

Although the present disclosure has been described with reference to one or more examples, workers skilled in the art will recognize that changes may be made in form and detail without departing from the scope of the disclosure and/or the appended claims.

The invention claimed is:

1. A method for modulating a source binary sequence formed by a plurality of source words, delivering modulated symbols, wherein the method comprises:
    error correction encoding said plurality of source words, implementing one or more encoding modules, each implementing a distinct error correction code, delivering a plurality of code words, said source words being encoded successively;
    interlacing said code words, delivering an interlaced sequence; and
    differentially modulating said interlaced sequence, delivering modulated symbols, wherein each code word is split into at least one group presenting a number of adjacent bits greater than one and equal to the base-2 logarithm of a number of states of a modulation implemented by said step of differentially modulating, and wherein said interlacing step distributes the groups in said interlaced sequence so that two adjacent groups in said interlaced sequence belong to distinct code words that were encoded successively with respect to one another.

2. The method for modulating according to claim 1, wherein said error correction encoding step implements at least two distinct error correction codes each delivering distinct code words.

3. The method for modulating according to claim 2, wherein, when said code words obtained by the implementation of distinct error correction codes have a different length, said interlacing step interlaces said groups until the interlacing step has distributed all the groups of the code word having the smallest length.

4. The method for modulating according to claim 1, wherein said code words comprise information bits and redundancy bits, each code word is split into at least one group of information bits and at least one group of redundancy bits, and wherein said interlacing step distributes said groups of information bits in said interlaced sequence, so that two adjacent groups of information bits in said interlaced sequence belong to distinct code words.

5. A non-transitory computer-readable memory comprising a computer software product recorded thereon and executable by a processor, wherein the product comprises program code instructions to implement a method of modulating a source binary sequence formed by a plurality of source words, delivering modulated symbols, wherein the method comprises:
   error correction encoding said plurality of source words, implementing one or more encoding modules, each implementing a distinct error correction code, delivering a plurality of code words, said source words being encoded successively;
   interlacing said code words, delivering an interlaced sequence; and
   differentially modulating said interlaced sequence, delivering modulated symbols, wherein each code word is split into at least one group presenting a number of adjacent bits greater than one and equal to the base-2 logarithm of a number of states of a modulation implemented by said step of differentially modulating, and wherein said interlacing step distributes the groups in said interlaced sequence so that two adjacent groups in said interlaced sequence belong to distinct code words that were encoded successively with respect to one another.

6. A device for modulating a source binary sequence formed by a plurality of source words, delivering modulated symbols, wherein the device comprises:
   one or more encoding modules configured to perform an error correction encoding of said plurality of source words, each encoding module implementing a distinct error correction code, delivering a plurality of code words, said source words being encoded successively;
   an interlacer configured to interlace said code words, delivering an interlaced sequence;
   a modulator configured to differentially modulate said interlaced sequence, delivering modulated symbols, wherein each code word is split into at least one group having a number of adjacent bits greater than one and equal to the base-2 logarithm of a number of states of a differential modulation implemented by said modulator, wherein said interlacer distributes said groups in said interlaced sequence so that two adjacent groups in said interlaced sequence belong to distinct code words that were encoded successively with respect to one another.

7. A method comprising:
   generating a signal formed by modulated symbols, wherein said modulated symbols are generated from a source binary sequence formed by a plurality of source words, having undergone before being sent:
      an error correction encoding of said plurality of source words, implementing one or more encoding modules, each implementing a distinct error correction code, delivering a plurality of code words, said source words being encoded successively;
      an interlacing of said code words delivering an interlaced sequence; and
      a differential modulation of the interlaced sequence, delivering modulated symbols, each code word being split into at least one group presenting a number of adjacent bits greater than one and equal to the base-2 logarithm of a number of states of said differential modulation, and said interlacing distributing said groups in said interlaced sequence so that two adjacent groups in said interlaced sequence belong to distinct code words that were encoded successively with respect to one another; and
   transmitting the signal.

8. A method for demodulating received symbols, corresponding to symbols modulated after passage in a transmission channel, delivering a reconstructed binary sequence, said modulated symbols being obtained from a source binary sequence formed by a plurality of source words, having undergone before being sent:
   an error correction encoding of said plurality of source words, implementing one or more encoding modules, each implementing a distinct error correction code, delivering a plurality of code words, said source words being encoded successively;
   an interlacing of said code words delivering an interlaced sequence; and
   a differential modulation of said interlaced sequence, delivering modulated symbols, each code word being split into at least one group presenting a number of adjacent bits greater than one and equal to the base-2 logarithm of a number of states of said differential modulation, and said interlacing distributing said groups in said interlaced sequence so that two adjacent groups in said interlaced sequence belong to distinct code words that were encoded successively with respect to one another, and
wherein said method for demodulating implements the following steps:
   differential demodulation of said received symbols, implementing a processing that is the inverse of the differential modulation implemented at sending side, delivering a demodulated sequence;
   de-interlacing said demodulated sequence, implementing a processing that is the inverse of the interlacing implemented at sending side, delivering a plurality of code words;
   decoding the code words, delivering said reconstructed binary sequence.

9. The method for demodulating according to claim 8, wherein said decoding step implements the following steps:
   correcting, from at least one error correction code, at least one first code word comprising at least one group comprising at least one erroneous bit, called a current group, to deliver a first corrected code word; and
   correcting, from said first corrected word, at least one distinct code word comprising a group adjacent to said current group in said demodulated sequence, called a neighboring group.

10. The method for demodulating according to claim 9, wherein the method comprises allocating a first value of confidence to the received symbol obtained from said neighboring group preceding said current group in said demodulated sequence and a second value of confidence to the received symbol obtained from said current group,
   and wherein correcting said distinct code word is implemented for the neighboring group preceding said current group in said demodulated sequence and/or for the neighboring group following said current group in said demodulated sequence in taking account of said values of confidence.

11. The method for demodulating according to claim 10, wherein said values of confidence are equal to the log likelihood ratio associated with the corresponding received symbol.

12. The method for demodulating according to claim 9, wherein correcting said distinct code word comprises:
- determining at least one candidate code word for said distinct code word;
- determining the syndrome associated with said candidate code word or words; and
- selecting said candidate code word having a zero syndrome, delivering the corrected distinct code word.

13. A non-transitory computer-readable memory comprising a computer software product recorded thereon and executable by a processor, wherein the product comprises program code instructions to implement a method of demodulating received symbols, corresponding to symbols modulated after passage in a transmission channel, delivering a reconstructed binary sequence, said modulated symbols being obtained from a source binary sequence formed by a plurality of source words, having undergone before being sent:
- an error correction encoding of said plurality of source words, implementing one or more encoding modules, each implementing a distinct error correction code, delivering a plurality of code words, said source words being encoded successively;
- an interlacing of said code words delivering an interlaced sequence; and
- a differential modulation of said interlaced sequence, delivering modulated symbols, each code word being split into at least one group presenting a number of adjacent bits greater than one and equal to the base-2 logarithm of a number of states of said differential modulation, and said interlacing distributing said groups in said interlaced sequence so that two adjacent groups in said interlaced sequence belong to distinct code words that were encoded successively with respect to one another, wherein said method of demodulating implements the following steps:
- differential demodulation of said received symbols, implementing a processing that is the inverse of the differential modulation implemented at sending side, delivering a demodulated sequence;
- de-interlacing said demodulated sequence, implementing a processing that is the inverse of the interlacing implemented at sending side, delivering a plurality of code words;
- decoding the code words, delivering said reconstructed binary sequence.

14. A device for demodulating received symbols, corresponding to symbols modulated after passage in a transmission channel, delivering a reconstructed binary sequence, said modulated symbols being obtained from a source binary sequence formed by a plurality of source words having undergone, before being sent:
- an error correction encoding of said plurality of source words, implementing one or more encoding modules, each implementing a distinct error correction code, delivering a plurality of code words, said source words being encoded successively;
- an interlacing of said code words delivering an interlaced sequence; and
- a differential modulation of the interlaced sequence, delivering modulated symbols, each code word being split into at least one group presenting a number of adjacent bits greater than one and equal to the base-2 logarithm of a number of states of said differential modulation, and said interlacing distributing said groups in said interlaced sequence so that two adjacent groups in said interlaced sequence belong to distinct code words that were encoded successively with respect to one another, and wherein the device comprises:
- a demodulator configured to differentially demodulate the received symbols, implementing a processing that is the inverse of the differential modulation implemented at sending side, delivering a demodulated sequence;
- a de-interlacer configured to de-interlace said demodulated sequence, implementing a processing that is the inverse of the interlacing implemented at sending side, delivering a plurality of code words; and a decoder configured to decode the code words, delivering the reconstructed binary sequence.

* * * * *